United States Patent [19]

Shiraishi et al.

[11] Patent Number: 4,657,395

[45] Date of Patent: Apr. 14, 1987

[54] APPARATUS FOR MEASURING DIAMETER OF CUTTING PORTION OF DRILL

[75] Inventors: Takashi Shiraishi, Nagaokakyo; Shirou Kitamura, Kyoto, both of Japan

[73] Assignee: Sanko Giken Kogyo Co., Ltd., Osaka, Japan

[21] Appl. No.: 643,181

[22] Filed: Aug. 22, 1984

[30] Foreign Application Priority Data

Aug. 27, 1983 [JP] Japan .............................. 58-156973

[51] Int. Cl.⁴ ............................................ G01B 11/10
[52] U.S. Cl. ..................................... 356/385; 250/560
[58] Field of Search .............. 356/384, 385, 386, 387, 356/426; 250/560

[56] References Cited

U.S. PATENT DOCUMENTS

| | | | |
|---|---|---|---|
| 3,874,798 | 4/1975 | Antonsson et al. | 356/386 |
| 3,901,606 | 8/1975 | Watanabe et al. | 250/560 |
| 4,417,147 | 11/1983 | Faville | 250/560 |
| 4,480,264 | 10/1984 | Duschl | 356/384 |
| 4,511,253 | 4/1985 | Glockner et al. | 356/385 |
| 4,531,625 | 7/1985 | Yonekura et al. | 356/386 |
| 4,532,723 | 8/1985 | Kellie et al. | 356/385 |

Primary Examiner—F. L. Evans
Attorney, Agent, or Firm—Joseph W. Farley

[57] ABSTRACT

An apparatus for measuring the diameter of the cutting portion of a drill comprising supporting-rotating means for supporting the drill and rotating the drill about its axis; an image sensor having a light receiving surface parallel with the drill and composed of a plurality of sensor elements, the sensor elements being arranged in the light receiving surface in a row at right angles with the drill; optical means for forming parallel rays propagating toward the cutting portion of the drill and for forming a silhouette of the drill cutting portion on the light receiving surface of the image sensor; silhouette width recognizing means for receiving from the image sensor a plurality of output patterns representing varying silhouette widths while the drill is rotated through a predetermined angle and for storing the output pattern corresponding to the largest silhouette width as selected from among the plurality of output patterns; and reading-displaying means for reading out the stored data from the silhouette width recognizing means and for displaying the data as the diameter of the drill cutting portion. The diameter of the cutting portion is automatically detected from varying silhouette widths of the cutting portion projected on the light receiving surface of the sensor, and the diameter is digitally displayed. The apparatus is therefore easy to operate and provides an accurate measurement within a short period of time.

1 Claim, 14 Drawing Figures

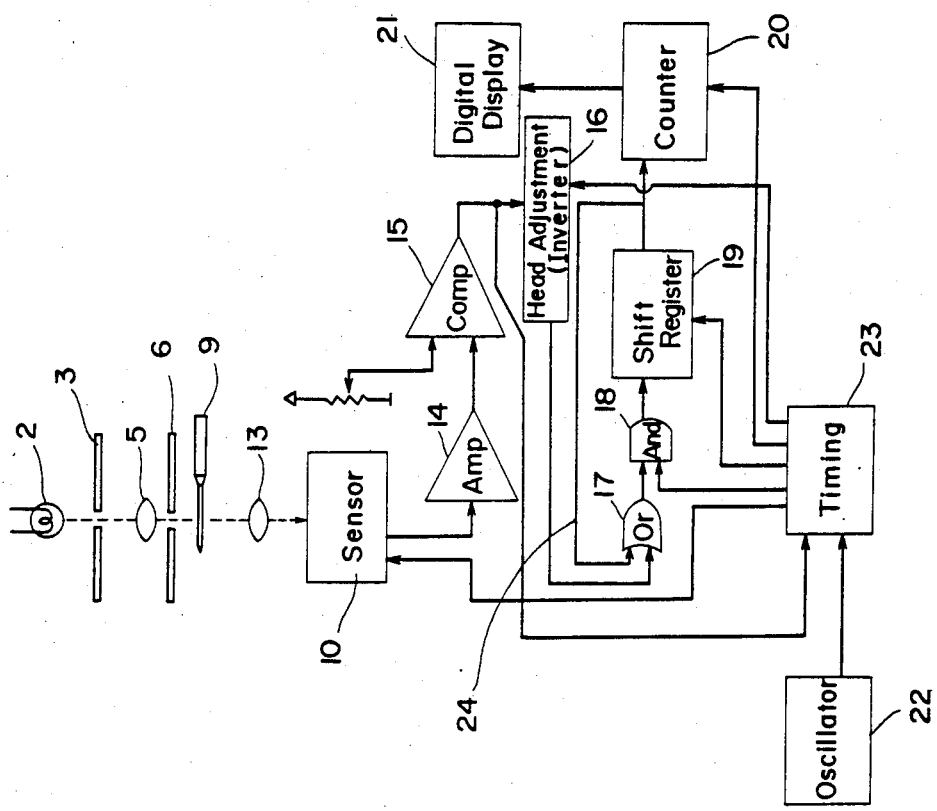
FIG. 6
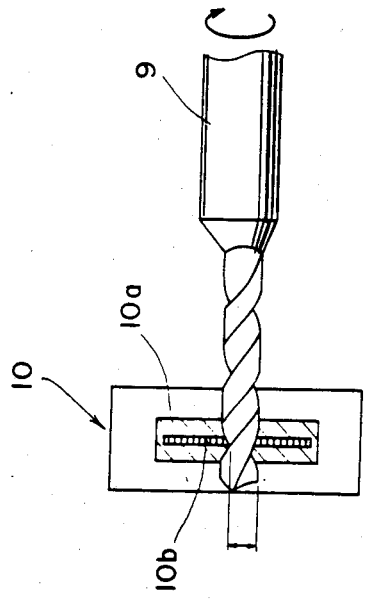
FIG. 4
FIG. 5

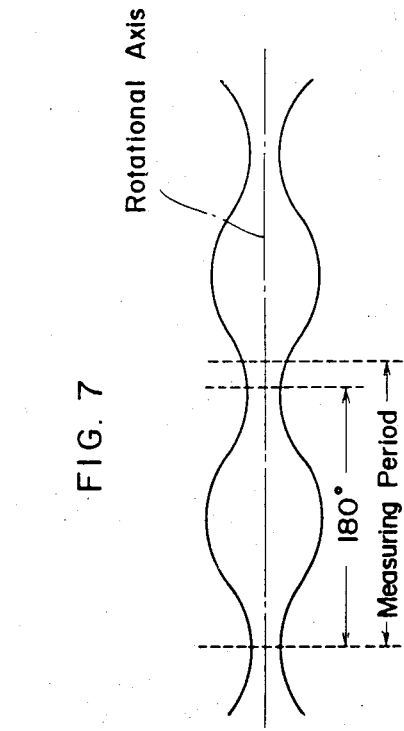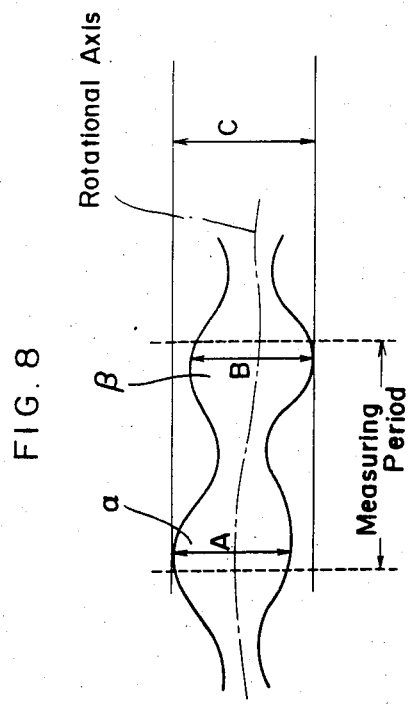

APPARATUS FOR MEASURING DIAMETER OF CUTTING PORTION OF DRILL

The present invention relates to an apparatus for optically measuring the diameter of the cutting portion of a drill and displaying the measurement digitally.

Generally holes are formed in printed circuit boards, etc. with a twist drill. To produce a hole of specified size with high precision, there is the need to use a drill having a predetermined diameter as measured accurately. The twist drill generally has a pair of cutting edges displaced from each other through 180° and extending helically about the axis of the drill, so that it is not easy to accurately measure the diameter of the cutting portion (the maximum diameter of the drill). For example, when the diameter is to be measured with a micrometer, the drill portion of maximum diameter must be identified for measurement, with the result that the measuring procedure requires time and considerable skill. Further with the projection method wherein the diameter is measured by projecting light on the drill sidewise to project its silhouette on a screen and reading a scale on the screen, the worker must set the maximum diameter portion to the scale by rotating the drill about its axis before reading. Accordingly the method takes time and has the problem that the measurement is not accurate owing to a reading error.

The present invention, which has been accomplished in view of the above situation, provides an apparatus for measuring the diameter of the cutting portion of a drill which comprises supporting-rotating means for supporting the drill and rotating the drill about its axis; an image sensor having a light receiving surface parallel with the drill and composed of a plurality of sensor elements, the sensor elements being arranged in the light receiving surface in a row at right angles with the drill; optical means for forming parallel rays propagating toward the cutting portion of the drill and for forming a silhouette of the drill cutting portion on the light receiving surface of the image sensor; silhouette width recognizing means for receiving from the image sensor a plurality of output patterns representing varying silhouette widths while the drill is rotated through a predetermined angle and for storing the output pattern corresponding to the largest silhouette width as selected from among the plurality of output patterns; and reading-displaying means for reading out the stored data from the silhouette width recognizing means and for displaying the data as the diameter of the drill cutting portion.

When the measuring apparatus of the above construction is used, the diameter of the drill cutting portion is automatically detected from varying silhouette widths of the drill cutting portion projected on the light receiving surface of the image sensor, and the diameter is digitally displayed by the reading-displaying means. The apparatus is therefore easy to operate and provides an accurate measurement within a short period of time.

Various features and advantages of the present invention will be readily understood from the following description of an embodiment given with reference to the accompanying drawings, in which:

FIGS. 4 and 5 are diagrams for illustrating a variation in the silhouette width of the cutting portion of the drill in rotation;

FIG. 6 is a block diagram showing a circuit construction useful for the measuring apparatus;

FIG. 7 is a diagram showing variations with time of the silhouette width projected on an image sensor when the rotational axis of the drill does not deflect;

FIG. 8 is a diagram showing similar variations when the axis deflects during rotation;

FIG. 9 is a diagram showing signal patterns produced from a comparator one after another;

FIG. 10 is a diagram showing signal patterns produced from a head adjustment circuit one after another;

FIG. 11 is a diagram showing signal patterns produced from a shift register one after another;

FIGS. 12 and 13 are an end view and a side elevation showing another twist drill to which the present invention is applicable; and FIG. 14 is a side elevation showing another twist drill to which the invention is applicable.

Figure 1:
FIGS. 1 and 2 are a side elevation and an end view, respectively, showing a drill to which the present invention is applied.
Figure 2:

The present invention is applied to twist drills such as the one shown in FIGS. 1 and 2. The illustrated drill has a pair of helical cutting edges 1 which are displaced from each other through 180°.

Figure 3:
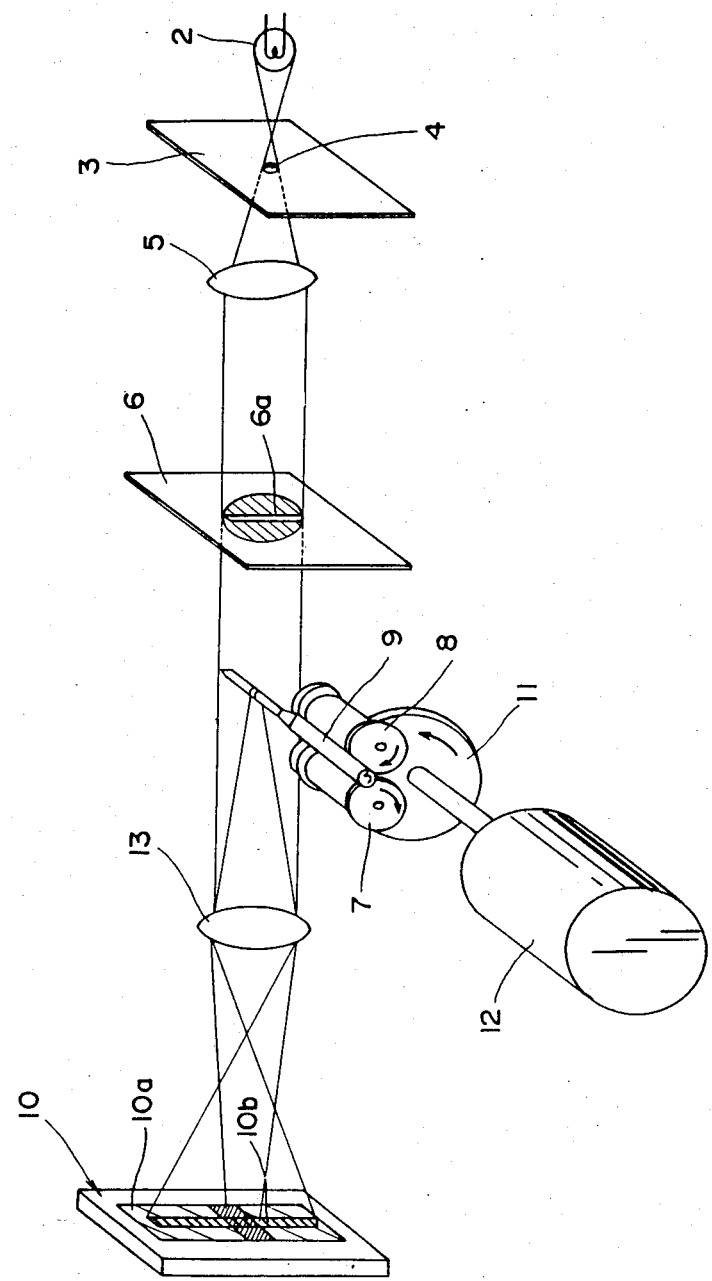
FIG. 3 is a perspective view schematically showing a measuring apparatus embodying the invention.

With reference to FIG. 3 showing a measuring apparatus of the invention, indicated at 2 is a light source having a given luminous intensity, in front of which there is disposed a diaphragm plate 3 having a small aperture 4 which is about 2 mm in diameter. The light passing through the aperture 4 is made into a cylindrical bundle of parallel rays by a condenser lens 5 provided in front of the diaphragm plate 3. Further disposed in front of the condenser lens 5 is a slit plate 6 having a slit 6a which is about 0.5 mm in width. The slit plate 6 reduces the cylindrical bundle of parallel rays to a strip-like beam of parallel rays, projecting the beam on the cutting portion of a drill 9 supported on a pair of parallel support rollers 7 and 8 as positioned therebetween. Since the beam impinging on the cutting portion of the drill 9 is in the form of a plate, the operator can readily recognize the drill portion which is exposed to the beam, enabling him to accurately position the drill 9 in place. The two support rollers 7 and 8 are in contact with the periphery of a rubber roller 11 coupled to a motor 12, which, when driven, rotates the drill 9 at a specified speed (one revolution per second in the present embodiment) through the rubber roller 11 and the support roller 7, 8. The silhouette of the drill cutting portion is projected on an enlarged scale (5× in the present embodiment) on the light receiving surface 10a of a self-scanning linear image sensor 10 by an image forming lens 13. The sensor 10, which is in parallel with the drill 9, is disposed in front of the lens 13. A multiplicity of (1024 in the present embodiment) photodiodes 10b are arranged at a pitch of 25μ in a row perpendicular to the drill 9 to provide the light receiving surface 10a of the image sensor 10. According to the present embodiment wherein the silhouette of the drill cutting portion is projected on the light receiving surface 10a as enlarged to a magnification of 5×, the diameter of the drill cutting portion can be measured within the accuracy range of 5μ. The width of the silhouette projected in the form of a thick line on the light receiving surface 10a of the image sensor 10 continuously varies between a minimum shown in FIG. 4 and a maximum shown in FIG. 5 because the cutting portion of the drill 9 has cutting edges and flutes. Generally the two cutting edges 1 of the drill 9 are displaced from each other by 180° (see FIG. 2), so that every time the drill 9 is rotated half a turn, the silhouette width invariably becomes maximum (the diameter of the cutting portion) once. Accordingly the diameter of the cutting portion can be obtained accurately by electrically processing the maximum silhouette width obtained at least during the half turn of the drill (0.5 second) and displaying the result as the diameter.

FIG. 6 shows the construction of an electric circuit for this purpose. The image sensor 10 is connected via an amplifier 14 and a comparator 15 to a head adjustment circuit 16 including an inverter circuit. By way of an OR gate 17 and an AND gate 18, the head adjusting circuit 16 is connected to a shift register 19 of the same bit as the image sensor 10. The output side of the shift register 19 is connected to the input side of the OR gate 17 via a circulation channel 24 and also to a counter circuit 20, which in turn is connected to a digital display circuit 21. The head adjustment circuit 16 has an input terminal which is connected to a timing circuit 23 connected to an oscillator 22. The timing circuit 23 feeds timing signals to the image sensor 10, the AND gate 18, the shift register 19, the head adjustment circuit 16 and the counter circuit 20.

Through the amplifier 14 and the comparator 15, the inverter circuit incorporated in the head adjustment circuit 16 receives from the image sensor 10 signal patterns (each of which is the sum of signals from the individual photodiodes 10b) and inverts each signal pattern, whereby the portion of the signal pattern corresponding to the silhouette of the drill cutting portion is raised. While timing signals are fed from the timing circuit 23 to the AND gate 18, the shift register 19, owing to the action of the OR gate 17, takes "OR" of the inverted signal pattern from the inverter circuit and the signal pattern fed back from the shift register 19 itself through the channel 24 and stores the pattern. Accordingly, owing to the feedback through the channel 24, the rise (leading) portion of the signal pattern once stored in the shift register 19 retains the raised state until one measuring sequence is completed, i.e. while timing signals are fed to the AND circuit 18 from the timing circuit 23.

The silhouette width of the drill cutting portion projected in the form of a thick line on the light receiving surface 10a of the linear image sensor 10 varies with time as seen in FIG. 7 and reaches a maximum (diameter of the cutting portion) while the drill 9 rotates through 180° (0.5 second). In this case, however, the maximum value is likely to appear twice during one measuring sequence. No problem will arise even if the maximum appears twice when the drill 9 rotates without deflection of its axis as seen in FIG. 7. Nevertheless, in the case where the rotational axis of the drill 9 deflects, for example, owing to a deposition on the support roller 7 or 8 and if the apparatus is not provided with the head adjustment circuit 16 (not relevant to the inverter circuit directly) unlike the present embodiment, a problem is encountered. In the absence of the head adjustment circuit 16, the signals from the image sensor 10 (in this case, signals from the individual photodiodes) are stored in the shift register 19 at the corresponding addresses, so that when the rotational axis of the drill 9 deflects as shown in FIG. 8, the distance C between the upper end of the first largest silhouette α and the lower end of the second largest silhouette β will be stored in the shift register 19 as the largest silhouette width. (The width A of the silhouette α and the width B of the silhouette β are equal.) The same problem will also be encountered when the drill 9 is bent.

The above problem is eliminated by positioning the heads (upper ends) of the silhouette α, β at the same level by the adjustment circuit 16 of the present embodiment. More specifically, the head adjustment circuit 16 coacts with the timing circuit 23 to provide such timing that the shift register 19 stores at the same address the heads of rise portions of the signal patterns which are delivered one after another from the image sensor 10. In other words, the head of rise portion of each signal pattern forwarded from the adjustment circuit 16 and the head of rise portion of the signal pattern stored in the shift register 19 and then fed back through the circulation channel 24 reach the OR gate 17 at the same time.

The above function of the head adjustment circuit 16 will be described in greater detail with reference to FIGS. 9 to 11. FIG. 9 shows the output signal patterns obtained from the comparator 15 by one measuring cycle (rotation of the drill 9 through about 180°). (The hatched portion corresponding to the silhouette is actually indented downward but is depicted as an upstanding portion for the convenience of illustration.) The diagram shows that the heads of the rise portions (leading edges) of the signal patterns are out of alignment. FIG. 10 shows the corresponding output signal patterns from the head adjustment circuit 16, indicating that the rise portion heads are in alignment. In this case, the third signal pattern from above corresponds to the diameter of the drill cutting portion. FIG. 11 shows the output signal patterns from the shift register 19. The diagram reveals that once a signal pattern (the third from above) corresponding to the largest silhouette width is stored in the shift register, the signal pattern is held stored until the measuring sequence is completed, by the action of the circulation channel 24. Accordingly even if the largest silhouette width appears twice while the drill 9 is in rotation with its axis deflected, the diameter can be measured accurately.

The operation of the apparatus will be described below with reference to FIGS. 3 and 6. First, the power supply for the apparatus is turned on to rotate the support rollers 7 and 8, and a drill 9 is placed on the rollers 7, 8 to position the cutting portion of the drill 9 across the beam projected through the slit 6a of the slit plate 6. Consequently a silhouette of the drill cutting portion is projected on the light receiving surface 10a of the linear image sensor 10 as enlarged to 5× by the image forming lens 13, with the silhouette width varying with the rotation of the drill 9, whereby signal patterns in accordance with the variations of the silhouette width are produced one after another from the image sensor 10. Via the amplifier 14 and the comparator 15, the output signal patterns are partly fed to the timing circuit 23, with the remainder fed to the head adjustment circuit 16, in which the signal patterns are aligned at the head and inverted. The patterns are sent to the OR gate 17 and further fed to the shift register 19 via the AND gate 18. Of the fed signal patterns, only the one corresponding to the largest silhouette width is held stored in the shift register 19 as already stated. After the completion of measurement, the shift register 19 is operated by one cycle, with no signals fed from the timing circuit 23 to the AND gate 18 and with no measuring signal fed to the register, whereby the shift register 19 is cleared of its contents in preparation for the next measuring sequence, while delivering the stored data of maximum value. The data is counted in the counter circuit 20 and stored. The count value is shown on the digital display 21 as an accurate measurement of diameter of the drill cutting portion. This operation is repeated upon lapse of every measuring time to display a new measurement every time.

The measuring apparatus of the invention is usable for drills of the type shown in FIGS. 1 and 2 and also for drills in which the angle of displacement of the cutting edges is not 180° as seen in FIGS. 12 and 13 and for those having cutting edges which are not rectangular as seen in FIG. 14. Thus the apparatus is usable for such drills (including augers) that the diameter of circular locus of rotating cutting edges is equal to the diameter of the cutting portion.

The linear image sensor 10 comprising photodiodes as sensor elements can be replaced by a linear image sensor which comprises, for example, charge coupled devices as sensor elements. When an image sensor comprising sensor elements of the dark-on type is used, the inverter circuit can be dispensed with. The head adjustment circuit can be also omitted if the drill is so rotated that the maximum value appears only once during the period of one measuring sequence. The optical system can be simplified when the light source comprises a laser adapted to project parallel rays.

The present invention is not limited to the illustrated embodiment, but the scope of the invention should be interpreted with reference to the appended claims only.

What is claimed is:

1. An apparatus for measuring the diameter of the cutting portion of a drill comprising supporting-rotating means for axially supporting and rotating the drill;
    an image sensor having a light receiving surface axially parallel with the drill and composed of a plurality of sensor elements, the sensor elements being arranged in the light receiving surface in a row axially transverse to the drill;
    optical means for forming parallel rays propagating toward the cutting portion of the drill and for forming a silhouette of the drill cutting portion on the light receiving surface of the image sensor;
    a head adjustment circuit for receiving signal patterns sent one after another from the sensor elements, each signal pattern having a rise portion head;
    a shift register for storing a signal pattern;
    an OR gate connected at its one input side to the output side of the head adjustment circuit and at its other input side to the output side of the shift register, and operable in response to each said signal pattern sent from the head adjustment circuit and the signal pattern fed back from the shift register;
    a timing circuit adapted to send a timing signal to the head adjustment circuit and to the shift register for feeding to the OR gate each said signal pattern from the head adjustment circuit and the signal pattern from the shift register with their rise portion heads in timed alignment;
    an AND gate connected at its one input side to the output side of the OR gate, at its other input side to the timing circuit and at its output side to the shift register, each signal pattern sent from the OR gate being fed through the AND gate to the shift register in response to a timing signal from the timing circuit;
    and reading-displaying means for reading out the stored data from the shift register and for displaying the data as the diameter of the drill cutting portion.

* * * * *